United States Patent Office 3,113,973
Patented Dec. 10, 1963

---

3,113,973
ORGANOPHOSPHORUS OXIDES AND METHOD OF PREPARING THEM
Arthur K. Hoffmann, Springdale, and Audrey Tesch Henderson, Stamford, Conn., assignors to American Cyanamid Company, New York, N.Y., a corporation of Maine
No Drawing. Filed Aug. 24, 1960, Ser. No. 51,512
6 Claims. (Cl. 260—606.5)

The present invention relates to novel tertiary phosphine oxides. More particularly, the instant discovery concerns a two-step process whereby tertiary aromatic phosphine oxides, such as triphenylphosphine oxide, are treated with lithium or potassium and the resulting mixture reacted with an organic halide to produce novel useful meta-substituted derivatives of said phosphine oxides.

According to the present discovery a tertiary phosphine oxide corresponding to the formula

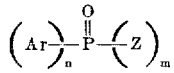

wherein $n$ is a value from 1 to 3 and $m$ is a value from 0 to 2, the sum of $n$ and $m$ being 3, Ar is an aryl group, mono-substituted or unsubstituted, said substituent, if any, being inert under the conditions of the reaction, and Z is an alkyl group having from 1 to 20 carbon atoms, is reacted, in the presence of an ether solvent selected from the group consisting of dimethyl ether, methyl ethyl ether, polyethers and cyclic ethers, with up to about 2 moles of lithium or potassium, i.e., is brought into intimate contact with lithium or potassium until substantially 2 moles of lithium or potassium per mole of phosphine oxide reactant has dissolved. The resulting salt or reaction mixture is admixed with a mono- or dihalo-substituted organic halide conforming to the formula $$X^1RX^2$$

wherein $X^1$ is halogen or hydrogen, $X^2$ is halogen, and R is alkylene, aralkylene, or alkenylene, the double bond of said alkenylene group being in a position at least beta to either halogen atom, said alkylene or alkenylene groups having from 3 to 20 carbon atoms. When both $X^1$ and $X^2$ are halogen atoms they are substituted on separate carbon atoms of R. When $X^1RX^2$ is a monohalide reactant, $X^1$ necessarily stands for hydrogen.

The above two-step reaction is made to take place under substantially anhydrous and anaerobic conditions. While the reaction is not fully understood, the product is positively identified and is a phosphine oxide differing from the reactant formula above in that, when an organic monohalide is employed, the organic moiety of the halide attaches at the meta-position of one of the aryl groups as follows:

—P=O + 2K / + CH₃I ⟶

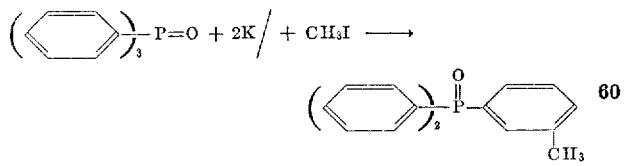

When an organic dihalide is employed the following reaction takes place:

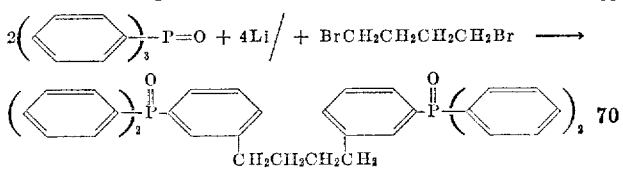

Generically, the novel organophosphorus compounds of the present invention, derived from the tertiary phosphine oxides corresponding to the formula

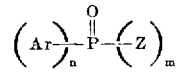

and a monohalide, conform to the following Formula A (A)

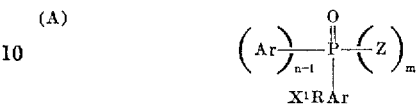

wherein $X^1$ is hydrogen.

On the other hand, whenever the tertiary phosphine oxide reactants are brought into contact with organic dihalides novel organophosphorus compounds are produced having the Formula B (B)

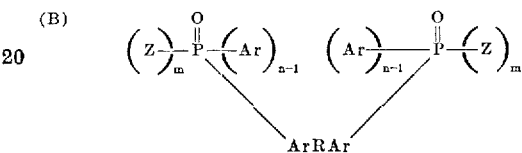

The symbols Ar, Z, R, $m$ and $n$ in these formulae have the same meaning given hereabove in the description of the novel process of the present invention. R in Formula B has the same meaning given above in the definition of $X^1RX^2$; in Formula A above, however, R in view of its terminal position on the molecule represents alkyl, aralkyl and alkenyl, a hydrogen atom having satisfied one of the carbon atoms of the corresponding alkylene, aralkylene and alkenylene moieties.

Among the many phosphine oxide reactants contemplated herein are diphenylmethylphosphine oxide, triphenylphosphine oxide, tri-o-tolylphosphine oxide, diphenylethylphosphine oxide, methyldi-p-tolylphosphine oxide, dimethyl(2,5-dimethylphenyl)phosphine oxide, diphenyl(4-N,N-dimethylphenyl)phosphine oxide, ethylpropylphenylphosphine oxide, and numerous other similar oxides embraced in the reactant formula given above.

By the same token, typical organic halides within the purview of the instant invention are methyl iodide, butyl bromide, benzyl chloride, methyl bromide, benzyl fluoride, bromopentene-2, octylbromide, allkyl chloride, cetyl iodide, and the like.

As indicated above, it is essential that the present process be carried out under substantially anhydrous and anaerobic conditions. The presence of water or air not only has a deleterious effect upon yields but gives rise to different organic derivatives of the phosphine reactant.

Among the ether solvents contemplated herein are methyl ethyl ether, 1,2-dimethoxyethane, tetrahydrofuran, or other polyethers, such as dimethyl or diethyl glycol ethers and other cyclic ethers.

Typical substituents contemplated for the aryl moiety or moieties of the tertiary aromatic phosphine oxide reactants defined above are alkyl, alkoxy, N,N-dialkyl, acetal, ketal, and like substituents which are inert under the conditions of the reaction, i.e., which do not provide an acidic hydrogen.

The novel meta-substituted phosphine oxide products of the present invention have direct utility as gasoline additives. For example, up to about 10 milliliters of any one of these products, when dissolved in one gallon of gasoline, affords protection against misfiring, surface ignition, and the like.

Surprisingly enough, when metallic sodium is employed in lieu of potassium or lithium the alkyl moiety of the alkyl halide reactant replaces one of the Ar groups of the reactant phosphine oxide, as fully illustrated in applicants' U.S. Patent 3,032,589, which issued May 1, 1962.

The following equation demonstrates this:

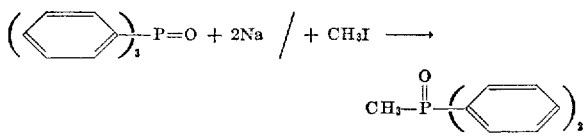

On the other hand, the following equation illustrates a typical embodiment of the instant discovery:

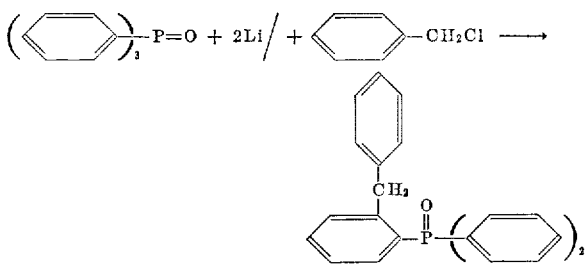

It has been found pursuant to the present invention that best results are obtained by providing up to 2 molar equivalents of metallic lithium or potassium per mole of tertiary phosphine oxide reactant. Preferably, 1–2:1 equivalents, lithium or potassium to oxide, is employed. On the other hand, the molar ratio of phosphine oxide to mono-halogen-substituted organic halide is generally about 1:1. Likewise, the phosphine oxide to di-halogen-substituted organic halide ratio is usually about 2:1. While the reaction of the oxide and halide reactants is essentially stoichiometric, an excess of either reactant with respect to the other is tolerable without materially affecting the reaction.

The reaction contemplated herein may be carried out at atmospheric, sub-atmospheric or super-atmospheric pressure. By the same token, temperatures in the range of $-40°$ C. to $200°$ C. are desirable, preferably $0°$ C. to $60°$ C. These temperatures are applicable to the first step of the reaction, i.e., the reaction of metallic lithium or potassium with the phosphine oxide reactant. Insofar as the second step of the reaction is concerned, i.e., treatment of the intermediate salt of phosphine oxide with an organic halide, temperatures in the range of $-60°$ C. to $100°$ C., preferably $-10°$ C. to $60°$ C., may be employed.

The invention will best be understood by reference to the following examples which while specific are not intended to limit the scope of the discovery.

EXAMPLE I

*Diphenyl-m-Tolylphosphine Oxide*

Triphenylphosphine oxide, 10.0 grams (0.036 mole) is charged to a 250-milliliter Erlenmeyer flask containing glass chips and a magnetic stirring bar. The flask is heated at $160°$ C.–$170°$ C. for several hours, after which the flask is connected to a nitrogen flushed distillation appartaus and 100 milliliters of 1,2-dimethoxyethane distilled onto the phosphine oxide under nitrogen. Metallic lithium, 0.5 gram (0.072 mole), cut into fine chips, is added under a nitrogen blanket and the reaction mass stirred for 4 hours. The resulting solution is a dark green-brown in color. At the end of this time, sufficient methyl iodide is added to decolorize the solution. The resulting reaction solution is then centrifuged and, from the resulting centrifugate, dimethoxyethane is removed by distillation, thus leaving an oily residue which is then re-extracted with benzene. Evaporation of the benzene gives diphenyl-m-tolylphosphine oxide product which, after recrystallization from cyclohexane-alcohol is substantially pure.

EXAMPLE II

*Diphenyl-m-(n-Butylphenyl)Phosphine Oxide*

Following the procedure of Example I, above, n-butyl bromide is added to decolorize the lithium triphenyl- phosphine oxide solution. After evaporation of the solvent, the resulting yellow residue is extracted with refluxing cyclohexane in lieu of ether. Product diphenyl-m-(n-butylphenyl)phosphine oxide separates on concentrating the solution and is purified by several recrystallizations from alcohol to give substantially pure product.

EXAMPLE III

*Diphenyl(α-Phenyl-m-Tolyl)Phosphine Oxide*

A reaction mixture of 2.81 grams (0.072 mole) of potassium and 10.0 grams (0.036 mole) of triphenylphosphine oxide in 100 milliliters of 1,2-dimethoxyethane is quenched at $0°$ C. with 12 grams (0.095 mole) of benzyl chloride after complete dissolution of the metal. After standing 6 hours, the reaction mixture is filtered and the solid isolated in the same manner as described for the lithium run. After one recrystallization from benzene followed by two from methanol diphenyl(α-phenyl-m-tolyl)phosphine oxide is obtained. It has melting point $235°$ C.–$238°$ C., melts undepressed when mixed with the sample prepared via the lithium reaction and has an identical infrared spectrum.

EXAMPLE IV

*Diphenyl(m-Ethylphenyl)Phosphine Oxide*

Triphenylphosphine oxide, 10.0 grams (0.036 mole), is reacted in 100 milliliters of 1,2-dimethoxyethane with 2.81 grams (0.072 mole) of potassium. After 6 hours stirring, 10 grams (0.092 mole) of ethyl bromide is added. Deposition of solid occurs during the exothermic reaction. The solid is removed by filtration and the filtrate evaporated to dryness. The resulting residue is extracted with refluxing cyclohexane which, upon cooling and concentrating, deposits 4.4 grams of diphenyl(m-ethylphenyl)phosphine oxide. An additional recrystallization from cyclohexane containing a small amount of charcoal yields pure product.

EXAMPLE V

*Ethylphenyl(α-Phenyl-m-Tolyl)Phosphine Oxide*

Diphenylethylphosphine oxide, 10.0 grams (0.043 mole), is stirred in 80 milliliters of 1,2-dimethoxyethane with 0.6 grams (0.086 mole) of lithium for 8 hours. At the end of this time, 6.0 grams (0.047 mole) of benzyl choride is added. After standing several hours, the reaction mass is centrifuged. The solvent is distilled from the supernatant solution leaving a brown oily residue which on the addition of 3 volumes of ether solidifies. The solid is filtered and washed with small portions of ether. The resulting solid is dissolved in benzene and passed through a 2″ x 1″ column of 33 percent Darco G–60 supported on HyFlo Supercel to remove all colored impurities. The clear benzene solution is evaporated to dryness and the residue crystallized from ether-benzene (90:10), to give substantially pure ethylphenyl-(α-phenyl-m-tolyl)phosphine oxide.

EXAMPLE VI

*Diphenyl(m-Isoamylphenyl)Phosphine Oxide*

The process of Example III, above, is followed in every essential respect with the exception that the organic halide used is isoamylbromide, 10.8 grams (0.072 mole). Product diphenyl(m-isoamylphenyl)phosphine oxide, after solvent evaporation, is crystallized from ether.

EXAMPLE VII

*Phenyl-p-Tolyl(m-Allylphenyl)Phosphine Oxide*

Diphenyl-p-tolylphosphine oxide, 10.0 grams (0.034 mole) dissolved in 100 milliliters of tetrahydrofuran is reacted with 2.65 grams (0.068 mole) of metallic potassium. After complete dissolution of the metal, 2.62 grams (0.034 mole) of allyl chloride is added. The reaction mixture is stirred for 3 hours and filtered. The filtrate, after evaporation, is crystallized to give phenyl-p-tolyl(m-allylphenyl)phosphine oxide.

EXAMPLE VIII

Diphenyl(α-Phenyl-m-Tolyl)Phosphine Oxide

The process of Example III, above, is followed in every essential respect with the exception that dimethylether is used as solvent and 7.9 grams (0.072 mole) of benzyl fluoride is used to react with the potassium solution instead of benzyl chloride. Diphenyl(α-phenyl-m-tolyl)phosphine oxide is produced and recovered.

EXAMPLE IX

Dimethyl-3,4-Dimethylphenylphosphine Oxide

A reaction mixture of 4.6 grams (0.118 mole) of metallic potassium in 125 milliliters of 1,2-dimethoxyethane initially containing 10 grams (0.059 mole) of dimethyl-p-tolylphosphine oxide is reacted with 8.4 grams (0.059 mole) of methyl iodide and the reaction mass stirred for 6 hours. At the end of this time, the solvent is removed by evaporation. Distillation of the residue affords dimethyl-3,4-dimethylphenylphosphine oxide in solid form.

EXAMPLE X

Tetramethylenedi-m-Phenylenebis(Diphenylphosphine Oxide)

To triphenylphosphine oxide, 10 grams (0.036 mole), is reacted in 100 milliliters of 1,2-dimethoxyethane with 0.5 gram (0.072 mole) of lithium. The resulting solution is treated with 3.8 grams (0.017 mole) of tetramethylene bromide and after standing for 3 hours is filtered. The resulting solid residue is extracted with hot chloroform, and product tetramethylenedi-m-phenylenebis(diphenylphosphine oxide) precipitates from solution by the addition of pentane.

While Example X defines the use of tetramethylene bromide as the dihalide reactant, other dihalides may be similarly employed to yield their corresponding phosphine oxides; for example, pentamethylene chloride, octamethylene iodide, α,α'dichloro-p-xylene, and the like, are typical.

The present application is a continuation-in-part of U.S. application for Letters Patent Serial No. 831,460, filed August 4, 1959, now U.S. Patent 3,032,589, which issued May 1, 1962.

We claim:

1. A novel method of preparing phosphine oxide derivatives in which a tertiary aromatic phosphine oxide conforming to the formula

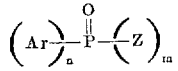

wherein $n$ is a value from 1 to 3 and $m$ is a value from 0 to 2, the sum of $n$ and $m$ being 3, Ar is selected from the group consisting of mono-substituted and unsubstituted aryl radicals, said substituents being inert under the conditions of the reaction and not providing an acidic hydrogen, and Z is alkyl having 1 to 20 carbon atoms, is reacted with up to about two moles of an alkali metal per mole of aromatic phosphine oxide reactant in the presence of an ether solvent selected from the group consisting of dimethyl ether, methyl ethyl ether, polyethers, and cyclic ethers, said alkali metal being selected from the group consisting of lithium and potassium, the resulting product is brought into intimate contact with an organic halide corresponding to the formula

wherein $X^1$ is selected from the group consisting of halogen and hydrogen, $X^2$ is halogen, and R is selected from the group consisting of alkylene, aralkylene and alkenylene radicals, the double bond of said alkenylene group being in a position at least beta to either halogen atom, and in the case where both $X^1$ and $X^2$ are halogen atoms they are attached to separate carbon atoms of R, said alkylene and alkenylene groups having from 3 to 20 carbon atoms; the above reactions being made to take place under substantially anhydrous and anaerobic conditions; and recovering the corresponding phosphine oxide derivative having a formula selected from the group consisting of (A) 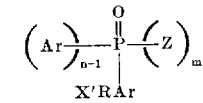

wherein $X^1$ is hydrogen, and (B) 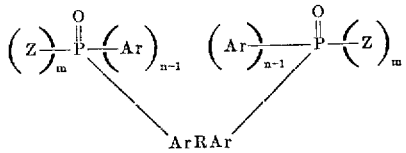

wherein Z, Ar and R have the meaning given hereinabove.

2. The process of claim 1 wherein $X^1$ of the reactant formula $X^1RX^2$ is hydrogen and the corresponding product of Formula A is recovered.

3. The process of claim 1 wherein $X^1$ of the reactant formula $X^1RX^2$ is halogen and the corresponding product of Formula B is recovered.

4. The process of claim 1 wherein the tertiary aromatic phosphine oxide reactant is triphenylphosphine oxide.

5. An organophosphorus compound having the formula

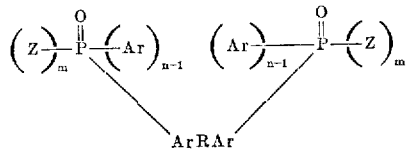

wherein $n$ is a value from 1 to 3 and $m$ is a value from 0 to 2, the sum of $n$ and $m$ being 3, Ar is selected from the group consisting of mono-substituted and unsubstituted aryl radicals, said substituents not providing an acidic hydrogen, Z is alkyl having 1 to 20 carbon atoms, and R is selected from the group consisting of alkylene, aralkylene and alkenylene, the double bond of said alkenylene being in a position at least beta to each of Ar moieties to which it is linked.

6. Tetramethylenedi - m - phenylenebis(diphenylphosphine oxide).

References Cited in the file of this patent

UNITED STATES PATENTS

| 2,138,835 | Butz | Dec. 6, 1938 |
| 2,160,840 | Dreyfus | June 6, 1939 |
| 2,174,019 | Sullivan | Sept. 26, 1939 |
| 2,274,291 | Clayton et al. | Feb. 24, 1942 |

OTHER REFERENCES

Kosolapoff: Organophosphorus Compounds, John Wiley and Sons, Inc., New York, 1950, page 115.

UNITED STATES PATENT OFFICE
CERTIFICATE OF CORRECTION

Patent No. 3,113,973                                December 10, 1963

Arthur K. Hoffmann et al.

It is hereby certified that error appears in the above numbered patent requiring correction and that the said Letters Patent should read as corrected below.

Column 2, line 45, for "allkyl chloride" read -- allyl chloride --.

Signed and sealed this 30th day of June 1964.

(SEAL)
Attest:

ERNEST W. SWIDER                                EDWARD J. BRENNER
Attesting Officer                                    Commissioner of Patents